(12) United States Patent
Kawaguchi et al.

(10) Patent No.: US 6,473,516 B1
(45) Date of Patent: Oct. 29, 2002

(54) LARGE CAPACITY STEGANOGRAPHY

(75) Inventors: Eiji Kawaguchi, Fukuoka (JP); Richard O. Eason, Orono, ME (US)

(73) Assignee: ASA Systems, Inc., Kitakyushu (JP)

( * ) Notice: Subject to any disclaimer, the term of this patent is extended or adjusted under 35 U.S.C. 154(b) by 0 days.

(21) Appl. No.: 09/316,883

(22) Filed: May 21, 1999

Related U.S. Application Data

(60) Provisional application No. 60/086,686, filed on May 22, 1998.

(51) Int. Cl.$^7$ .................................................. G06K 9/00
(52) U.S. Cl. ....................................................... 382/100
(58) Field of Search ................................ 382/100, 164, 382/165, 171, 172, 173, 175, 180, 224, 228, 232, 276, 286, 291; 713/176, 179, 180, 181; 370/523, 527, 529

(56) References Cited

U.S. PATENT DOCUMENTS

| | | | | |
|---|---|---|---|---|
| 5,530,759 A | * | 6/1996 | Braudaway et al. | 380/54 |
| 5,659,726 A | * | 8/1997 | Sanford, II et al. | 707/101 |
| 5,734,752 A | * | 3/1998 | Knox | 382/212 |
| 5,814,801 A | * | 9/1998 | Wang et al. | 235/454 |
| 5,987,136 A | * | 11/1999 | Schipper et al. | 713/176 |
| 6,111,990 A | * | 8/2000 | Sugaya et al. | 382/250 |
| 6,208,745 B1 | * | 3/2001 | Florencio et al. | 382/100 |

OTHER PUBLICATIONS

"Data embedding into pictorial images with less distortion using discrete cosine transform", By Ogihara et al., IEEE, 1996.*
"Adaptive watermarking in the dct domain" By Tao et al., IEEE, 1997.*
"Adaptive watermarking" By Wong et al., IEEE, 1997.*

* cited by examiner

*Primary Examiner*—Andrew W. Johns
*Assistant Examiner*—Shervin Nakhjavan
(74) *Attorney, Agent, or Firm*—Michael J. Persson; Lawson, Philpot & Persson, P.C.

(57) ABSTRACT

A technique for hiding information in an image that is based a property of the human vision system. Because of its relation to human vision properties, the technique of the present invention provides an information hiding capacity is as large as 50% of the original image data. The method includes the steps of segmenting each region of a vessel image into informative and noise-like regions by using a threshold value, arranging the data into a series of data blocks, and embedding each data block into the noise-like regions of the image.

25 Claims, 4 Drawing Sheets

LARGE CAPACITY STEGANOGRAPHY

CLAIM OF PRIORITY

This application claims the benefit of priority under Title 35, United States Code §119(e) of U.S. Provisional Patent Application Ser. No. 60/086,686, filed on May 22, 1998.

FIELD OF THE INVENTION

The present invention relates to the field of steganography and in particular to steganography using a digital image.

BACKGROUND OF THE INVENTION

Digital images are becoming more and more commonplace, and nowhere are these images more prevalent than on the Internet's World Wide Web. The vast majority of today's World Wide Web pages are decorated with color images and, thus, people browsing through the Web no longer pay special attention to sites containing images or to the downloading of image data from the Web.

The abundance of digital images posted on the World Wide Web has led to the development of steganographic, or information hiding, programs aimed at invisibly marking copyrighted images to aid in enforcement of the copyright by the copyright owner. In recent years, several steganographic programs have been posted on the World Wide Web. Most of these programs use image data for the container, or carrier, of the confidential information and some use the least significant bits of the image data to hide the confidential informnation. Other programs embed the confidential information in a specific band of the spatial frequency component of the carrier, while still others make use of the sampling error in image digitization. However, each of these steganographic methods have a relatively small information hiding capacity, allowing only 5–15% of the carrier image to hide information. This capacity is generally sufficient for "water marking" or placing a digital "signature" onto computer data, but is generally insufficient for confidential human to human communications applications.

The explosion of the Internet has also increased concerns by network users over the security of Internet communications. For example, Internet e-mail is not a reliable means for sending confidential messages as these communications are easily intercepted. This ease of interception has led to the development and commercial distribution of many encryption programs. However, there are some cases when a user may wish to send a message to a person without the fact that a message has been sent being noticed by anyone else. Encrypting the message cannot solve this problem as encryption can hide the content of the message, but cannot hide the message data itself. Thus, anyone can intercept the "unreadable message" and know that a message has been transmitted between the parties. Though appearing to be innocuous, this type of information may be very important to people such as unscrupulous business competitors or securities dealers, or even to organized crime figures, who may be keeping the sender or receiver under surveillance. Therefore, there is a need for a way to transmit data without the risk of another intercepting either the content of the message or the fact that a message has been sent.

Notwithstanding its usefulness in safeguarding human to human communications, high volume data embedding techniques also could be useful in a number of other areas. For example, certain personal data may be embedded within an image on a credit card, identification card, passport or the like in order to prevent counterfeiting or falsification. In addition, it is contemplated that sound data could be embedded within digital photographs to allow these sounds to be played when the image is viewed.

Therefore, a method of hiding a relatively large amount of confidential data in a digital image for downloading by another that eliminates the risk of a third party intercepting the content of the message and eliminates the risk of a third party becoming aware of the fact that a message has been sent, is not known in the art.

SUMMARY OF THE INVENTION

The present invention is a technique for hiding confidential information in a color image that is not based on a programming technique, but rather on a property of the human vision system. Because of its relation to human vision properties, the technique of the present invention provides an information hiding capacity of as much as 50% of the original image data and, in some circumstances, may provide hiding capacities in excess of 50%.

In its basic form, the method of the present invention includes the steps of transforming a dummy image from PBC to CGC system, segmenting each bit-plane of the dummy image into informative and noise-like regions by using a threshold value ($\alpha$), arranging the confidential file into a series of confidential blocks, conjugating blocks that are more complex than a threshold value, embedding each confidential block into the noise-like regions of the bit-planes, recording conjugated blocks in a "conjugation map", embedding the conjugation map within the image, and converting the embedded dummy image from CGC to PBC.

In another embodiment, the method includes the steps of dividing the image into regions, determining an "embedding depth" in each region based on a complexity measure, arranging the confidential file into a series of confidential blocks, embedding the confidential blocks in the least significant bit planes of each region according to the computed embedding depth, recording the embedding depths in a "depth map", and embedding the depth map within the image Therefore it is an aspect of the invention to provide a steganography method that results in a large information hiding capacity.

It is a further aspect of the invention to provide a steganography method that prevents third parties from reading a confidential message.

It is a further aspect of the invention to provide a steganography method that prevents third parties from knowing that a confidential message has been sent.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE DRAWINGS

Digital images are categorized as either binary (black-and-white) or multi-valued pictures despite their actual color. In addition, it is well known that an n-bit image may be decomposed into a set of n binary images by bit-slicing operations. Though adapted best for use with gray coding systems such as the Canonical Gray Coding system (CGC), such bit-slicing operations may also be performed with the Pure-Binary Coding system (PBC) or other coding systems.

Image complexity is a critical factor in the information hiding capacity of a given image. However, there is no standard definition of image complexity. The problem of image complexity was discussed in connection with an image thresholding problem by Kawaguchi and Taniguchi in their paper "Complexity Of Binary Pictures And Image Thresholding", IEEE Trans. on PAMI, Vol.5, No.4, pp 373–384, 1988, incorporated herein by reference. Though this paper proposes three types of complexity measures, the preferred embodiment of the present invention utilizes a black-and-white border measure of image complexity. Further, although the examples assume that the arrays of pixels are square, other embodiments of the system having hexagonal or triangular arrays of pixels may compute the length of a black and white border in a similar manner.

The length of the black-and-white border in a binary image is a good measure for an image complexity. If the border is long the image is complex; otherwise it is simple. The total length of a black-and-white border equals the summation of the number of color-changes along the rows and columns in an image. For example, a single black pixel surrounded by white background pixels has a border length of 4. Thus, we will define the image complexity $\alpha$ by the following.

$$\alpha = \frac{k}{\text{The max. possible } B - W \text{ changes in the image}}$$

Where, k is the total length of black-and-white border in the image. Thus, the value of $\alpha$ is always greater than or equal to zero and less than or equal to one. The value of $\alpha$ is defined globally, i.e., $\alpha$ is calculated over the whole image area, and thus gives us the global complexity of a binary image. However, we can also use a to calculate local image complexity (e.g., complexity over an 8×8 pixel size area).

In binary images that are parts of natural images, informative images are simple while noise-like images are complex. Referring now to FIGS. 1–6, we will introduce a "conjugation" operation on a binary image and will discuss how many image patterns are informative and how many patterns are noise-like.

Figure 1:
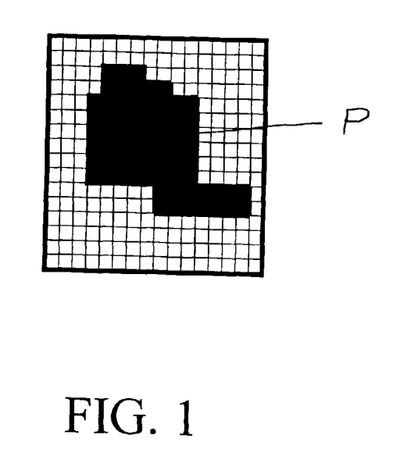
FIG. 1 is a diagrammatic view of image P having a black area as the foreground and a white area as the background.
Figure 2:
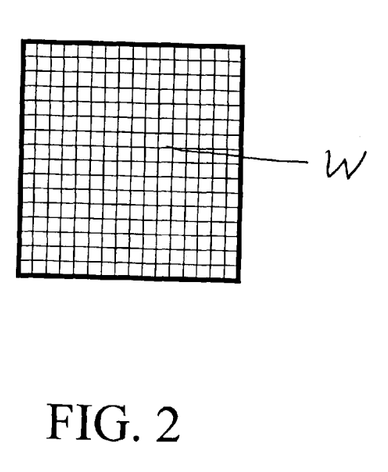
FIG. 2 is a diagrammatic view of image W having an all white pattern.
Figure 3:
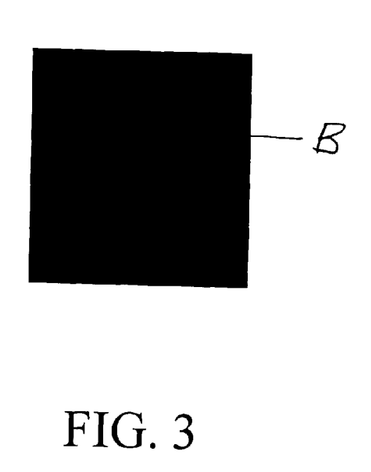
FIG. 3 is a diagrammatic view of image B having an all black pattern.
Figure 4:
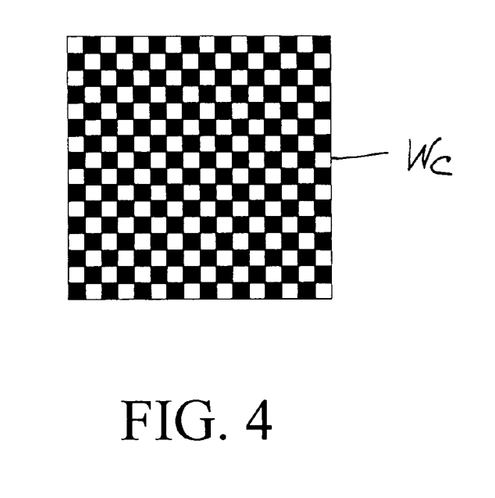
FIG. 4 is a diagrammatic view of image Wc having a checkerboard pattern with a white pixel at the upper left position.
Figure 5:
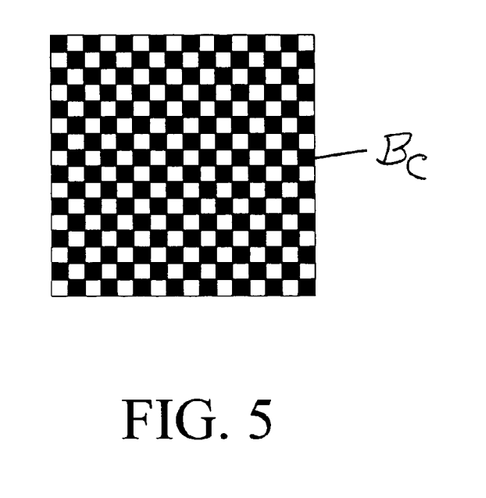
FIG. 5 is a diagrammatic view of image Bc having a checkerboard pattern with a black pixel at the upper left position.
Figure 6:
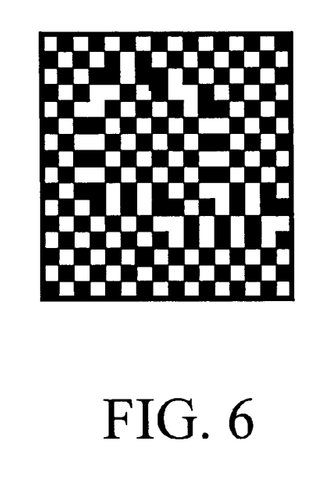
FIG. 6 is a diagrammatic view of image P*.

Let P (FIG. 1) be a $2^N \times 2^N$ size black-and-white image with black area as the foreground and white area as the background. W (FIG. 2) and B (FIG. 3) denote all white and all black patterns, respectively. We also introduce two checkerboard patterns Wc (FIG. 4) and Bc (FIG. 5), where Wc has a white pixel at the upper-left position, and Bc is its complement, i.e., the upper-left pixel is black. In converting these images to binary, black and white pixels have logical value "1" and "0", respectively. P is interpreted as follows; pixels in the foreground area have B pattern, while pixels in the background area have W pattern. P* as the conjugate of P which satisfies the following criteria:

1) The foreground area shape is the same as P.
2) The foreground area has the Bc pattern.
3) The background area has the Wc pattern.

Thus, correspondence between P and P* is one-to-one.

The following easily proven properties hold true for such conjugation operation where "$\oplus$" designates the exclusive OR operation.

A) $P^* = P \oplus Wc$
B) $(P^*)^* = P$
C) $P^* \neq P$

Given the conjugation values, the image complexity may be determined in the following manner:

If $\alpha(P)$ is the complexity of a given image or region P, then;

$$\alpha(P^*) = 1 - \alpha(P)$$

It is evident from the foregoing that the combination of each local conjugation (e.g., 8×8 area) makes an overall conjugation (e.g., 512×512 area). Further, the above equations means that every binary image pattern P has its counterpart P* and that the complexity value of P* is always symmetrical against P where $\alpha = 0.5$.

Figure 7:
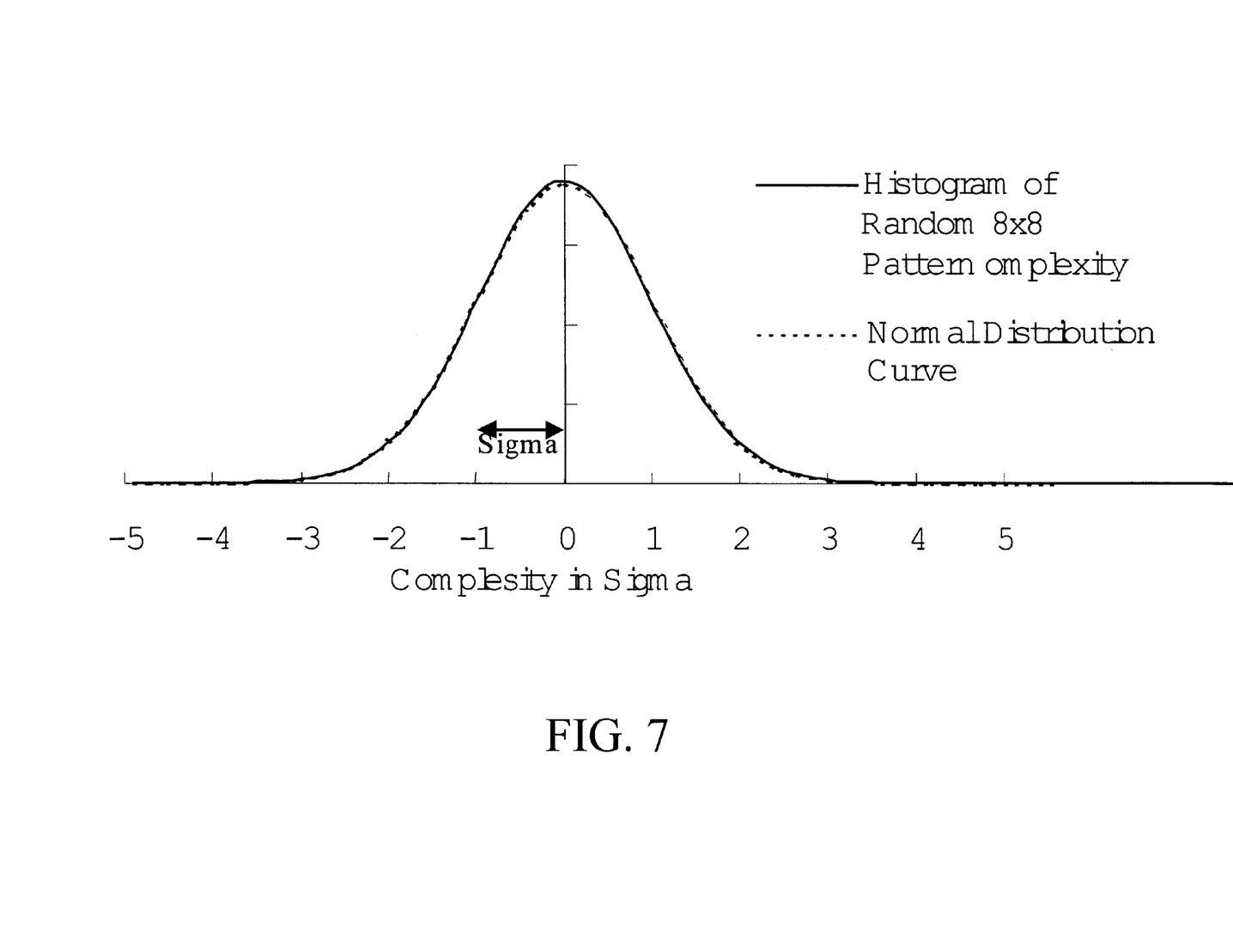
FIG. 7 is a histogram of the complexity of randomly generated 8×8 binary patterns.

As noise like patterns of an image may be replaced without being perceptible to the human eye, how many binary image patterns are informative and how many patterns are noise-like respecting $\alpha$ is of particular interest. Assuming that an 8×8 pixel block is a good size for local area, the total number of 8×8 binary patterns in relation to $\alpha$ value must be determined. This means that all $2^{64}$ different 8×8 patterns must be checked. However, $2^{64}$ is too huge to make an exhaustive check by any means. To overcome this problem, the following practical approach was used to simulate a distribution of $2^{64}$ binary patterns. This approach involves generating as many random 8×8 binary patterns as possible, where each pixel value is set random but has equal black-and-white probability, and generating a histogram of all generated patterns in terms of $\alpha$. This approach simulates the distribution of $2^{64}$ binary patterns without the need of actually checking each individual pattern. FIG. 7 shows the histogram for 4,096,000 8×8 patterns generated by a computer using this method. This histogram shape almost exactly fits the normal distribution. The average value of the complexity $\alpha$ was exactly 0.5. The standard deviation was 0.047 in $\alpha$; denoted as $\sigma$ "sigma" in FIG. 7.

Once the image complexity has been determined, the next question to be answered is how much image data can be discard without deteriorating image quality, or, how much informative data is indispensable to maintaining the image information? To discard data means to replace local image areas in a bit-plane with random noise patterns. If we replace all the local areas having complexity value $\alpha_L \leq \alpha$, yet the image maintains good quality, then more data may be discarded. If quality is perceptibly reduced, less data may be discarded. If $\alpha = \alpha_L$, is the minimum complexity value to maintain good image quality, such $\alpha_L$, is the said to be a threshold value.

Image data is said to be indispensable in order for the image to be "informative" if the resulting image data is still "picture-like" after we have discarded (randomized) a certain amount of image data for such an cc that $\alpha \geq \alpha_U$, but would become only noise-like as more data is discarded. In such a case, $\alpha_U$ is regarded as the limit of the informative image complexity. If $\alpha_L$ and $\alpha_U$ coincide ($\alpha_0 = \alpha_L = \alpha_U$), we can conclude $\alpha_0$ is the complexity threshold to divide informative and noise-like regions in a bit-plane.

Figure 8:
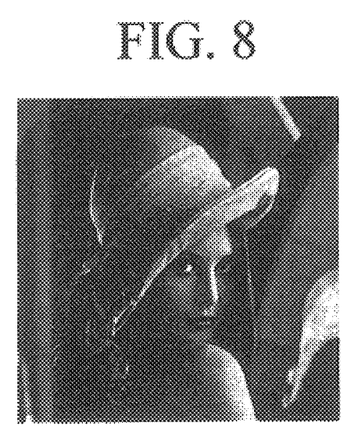
FIG. 8 is a color digital image before altering.
Figure 9:
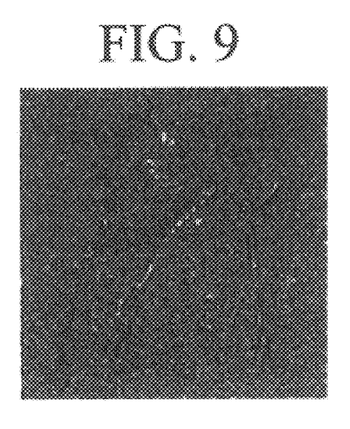
FIG. 9 is the color digital image of FIG. 8 after all simple regions of the image have been replaced by random bits.
Figure 10:
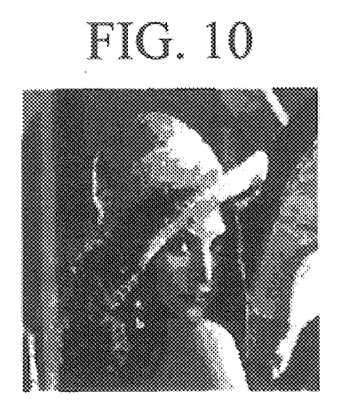
FIG. 10 is the color digital image of FIG. 8 after all complex regions of the image have been replaced by random bits.

To test these assumptions, a "random pattern replacing" experiment was conducted on a bit-plane of a color image. The resulting images are shown in FIGS. 8–10 where FIG. 8 represents the original image, FIG. 9 represents a randomization of the simple side of the image (i.e. where $\alpha \geq 0.5-8\sigma$ and FIG. 10 represents a randomization of the complex side of the image (i.e. where $\alpha \geq 0.5-\sigma$). As FIGS. 8–10 shows, if the less complex regions in each bit-plane are randomized, the image is no longer representative of the original image. Conversely, the more complex regions may be randomized without losing much of the resolution of the original image.

Similar experimentation revealed that most of the informative image information is concentrated in between 0 and $0.5-8\sigma$ in complexity scale. Surprising enough, this represents only $6.67 \times 10^{-14}\%$ of all 8×8 binary patterns. The remaining 99.9999999999333% are mostly noise-like binary patterns.

One embodiment of the present invention utilizes bit-plane complexity segmentation (BPCS) steganography as a steganographic technique for increasing information hiding capacity to a point where confidential human to human communications are possible. In the method of the present invention, the carrier image is called a "dummy" image or a "vessel" image. Such an image can be a color or Gray-level image in BMP file format, which hides, or embeds, confidential information such as text or other types of files. Each confidential file is segmented into a series of blocks having 8 bytes data each that are regarded as 8×8 image patterns. These blocks are called confidential blocks.

In the BPCS method, the algorithm for embedding a file into a dummy image involves the following steps:

1) Transforming the dummy image from PBC to CGC system.
2) Segmenting each bit-plane of the dummy image into informative and noise-like regions by using a threshold value (($\alpha_0$); with a typical value being ($\alpha_0 = 0.3$.
3) Arranging the confidential file into a series of confidential blocks.
4) If a block (S) is less complex than the threshold ($\alpha_0 < 0.5$), then conjugating it to make it a block (S*) that is more complex than $1\alpha_0$
5) Embedding each confidential block into the noise-like regions of the bit-planes (or, replacing all the noise-like regions with a series of confidential blocks). If the block is conjugated, then recording it in a "conjugation map."
6) Embedding the conjugation map after the confidential file embedding step.
7) Converting the embedded dummy image from CGC to PBC.

The decoding algorithm for performing the extracting operation of the confidential information from an embedded dummy image is simply the reverse procedure of the embedding steps.

Typically the conjugation map is only required to record one bit of conjugation information about confidential data blocks whose original complexities are less than $\alpha_0$ or greater than $1\alpha_0$. This is because blocks of complexity less than $\alpha_0$ will become blocks of complexity greater than 1 $\alpha_0$ after conjugation, and data blocks whose original complexity is between $\alpha_0$ and $1\alpha_0$ will never be conjugated.

Note that the complexity threshold used for determining which regions are embeddable can be different from the complexity threshold used for conjugating the confidential data, as long as the former threshold is smaller. Furthermore, both thresholds can be varied pseudo-randomly in a deterministic fashion to make it more difficult for an attacker to detect and/or extract the embedded information.

The BPCS-Steganography method of the present invention is different from prior systems due in part to segmentation of each bit-plane of an image into "informative" and "noise-like" regions, the introduction of the B-W border based complexity measure ($\alpha$) for region segmentation, the introduction of the conjugation operation to convert simple confidential blocks to complex blocks and the use of the CGC image plane instead of PBC plane.

A number of information embedding experiments were performed and, in each, it was found that the information hiding capacity was around 50% of each dummy image for color images taken by a digital camera and used as dummy images. This capacity is four to five times the amount of information capable of being hidden using currently known steganography techniques.

The BPCS-Steganography method has several embedding parameters for a practical program implementation. These parameters include the embedding location of the header(s) of the confidential file(s), the embedding threshold ($\alpha_0$), the sequence in which the 8×8 regions of the vessel image are considered for embedding (e.g., use a seed for a pseudo-random sequence), the encoding and embedding of the conjugation map, special operations, such as an exclusive-or of the header bytes and/or embedded data with pseudo-random numbers or selected parts of the vessel file, the encryption parameters of the confidential file(s), and the compression parameters of the confidential file(s). Using the method of the present invention, each program user can assign his/her special parameters when installing allowing a single BPCS-Steganography program to be customized. Such a customized program would not compatible to any other program and would serve the purpose of preventing any unauthorized access to the confidential information should it be found that an image contains the information.

In an alternative embodiment of the invention, an extension of the BPCS method called pixel difference complexity segmentation (hereafter PDCS) is utilized. PDCS differs from the conventional BPCS in that it treats all planes within each region (e.g., 8×8) collectively rather than individually when deciding which planes in the region will be used for embedding. As with BPCS, PDCS can also utilize variations in embedding parameters for customization In the following example an 8×8 region of 8-bit bytes is used. However, the method can work with any size region and/or word size. As with BPCS method, color schemes such as RGB can treat the different components independently (i.e., embed in the red values independently from the blue and green, etc.). The terms "4-neighbor" and "8-neighbor" are used in the example. In this context, the 4-neighbors of a pixel are the four pixels above, below, left and right of the pixel. The 8-neighbors of a pixel additionally include the four pixels that are diagonally adjacent.

The objective of the PDCS method is to determine which planes within each 8×8 region are embeddable (i.e., which bit planes are lower order bit planes that may be altered without degrading image quality). In order to accomplish this, the number of the lower order planes to be used within each region must be determined. It is preferred that this determination be made utilizing a complexity measure based on statistical properties of the pixels in the region. One example would be to take a 2-dimensional Fourier transform and base the embedding depth on the magnitude of the high frequency components. However, other common methods may also be utilized to achieve similar results.

The PDCS method involves computing the magnitude of the difference between each pixel and its 4-neighbors for the pixels inside the 8×8 region, or to compute differences with the 8-neighbors. The differences considered could be limited to those between points within the region, but further variations may be made by considering differences between edge pixels and their neighbors outside the region. For example, assuming 4-neighbors are used and the differences between pixels inside and outside the region are not included, we would have 112 differences for an 8×8 region using 4-neighbors (i.e. 7 differences in each row/column and 8 rows and 8 columns 7*16=112). For an image with 8-bit values, the differences can range from 0 to 255.

As was the case with the BPCS method the next step is to choose a complexity threshold. For the purposes of our example, we will choose 24 as this threshold. Noting that in a given region the largest differences between adjacent pixels are the ones that contribute to the complexity values in higher bit planes, if our threshold is 24 then we want to determine the 24$^{th}$ largest difference, which we will call $D_t$ (i.e., exactly 23 difference values are of this value or higher). $D_t$ may be determined by generating a histogram of the differences and taking the integral of this histogram. Utilizing this method, $D_t$ is the point at which the integral increases to greater than the maximum minus the threshold. However, it is contemplated that other art recognized methods may also be utilized.

The next step is to embed data in n bit planes of this region, where n is the smallest integer value such that $2^n > k D_t$ (I.e., $n > \log_2 (k D_t)$.), where k is a parameter which affects how rounding is to be handled. In the preferred method, k=1 for a "round up" effect or k=2/3 for a "round to nearest" effect. However, it is recognized that other rounding values may be used.

This approach is very similar to the standard version of BPCS, except that PDCS has the effect of normalizing each transition between pixels. For example, in standard BPCS, two adjacent pixels with values of 6 (binary 00000110) and 11 (binary 00001011) will add one to the complexity computation in bit planes 8, 6, and 5 (where plane 8 is the least significant). If Gray Coding is used, then the binary values are 00000101 and 00001110, respectively, and this transition adds one to the complexity of planes 8, 7, and 5. With PDCS method, the difference between pixel values, in this case 5, is used to determine which planes will get one added to their complexity. A difference of 5 (binary 00000101) means the lower three planes get one added to their complexity. As with BPCS, the complexity must be greater than the threshold if a plane is allowed to contain embedded information.

Utilizing this approach, the lower n bit planes are used for embedding, where n is computed according to a complexity measure such as that given above. However, bits in the higher bit planes may also be changed such that each pixel undergoes the least possible change in value during embedding. This can be done by adding or subtracting $2^n$ to the pixel value. For examnple, if a pixel originally has a value of 49 (binary 00110001) and the lower three bits are to be replaced with a binary value of 110, then it would change the pixel less if we subtract $2^3=8$ from this pixel when embedding this value. This means we replace the pixel with 46 (binary 00101110) rather than 54 (binary 001101 10), as the former is closer to the original pixel value.

The embedding operation changes the pixel values and therefore the pixel differences. Accordingly, the extraction method requires a method of determining the embedding depth, n, in each region. One solution is to add or subtract $2_n$ from selected pixels in the region in order to control the difference histogram of the region for the purpose of making the depth computation unchanged after embedding. This allows the same value for n to be computed after embedding. As discussed below, another solution is to use a depth map.

One alternative to the above method would be to fit a plane to the data in the -region and subtract this plane from each value before computing the pixel differences. Such an alternative would cancel out the effect of pixel differences due to sloping regions and would base embedding depth only upon differences due to "noise", effectively limiting embedding depth in any smooth but sloped regions.

As mentioned above, another method of determining Dt, and, consequently, the value of n in each region, is to embed a "depth map" along with the data. The depth map indicates the embedding depths for each successive region. For 8-bit pixel values, the embedding depth will be a number from 0 to 8, although a value ranging from 0 to 7, which can be represented with three bits, may be used if the most significant bit plane is not to be embedded. Another possibility is to use a compression scheme, such as Huffman Encoding, for the values in the depth map.

The depth map may be distributed in any of several methods. For example the embedding depth for each region may be stored within the region itself, or regions may be grouped in pairs such that one region of each pair embeds one byte representing the depth for both pairs. Another method involves forming larger groups of regions and arranging all of their depth information, in compressed or uncompressed form, to fill an integral number of bit-planes within one or more regions. A simple version of this method would group successive blocks of 21 regions each. In each block, the least significant bit plane of a pre-selected region would contain the depth information packed as three bits per region (i.e., do not allow n=8). All other embeddable bit planes within these 21 regions would contain data.

In order to make the depth information more difficult for an attacker to find and extract, the region containing this depth information can be deterministically changed from region to region according to the customization information. A 3-bit value for 21 regions requires 63 bits, while the bit plane contains 64 bits. The 64$^{th}$ bit can be used as an indicator as to whether the region contains depth information at all (i.e., the region is relatively flat and the depth for this region is 0). If this is the case the search for the depth information passes on to the next region.

One method of handling this 64$^{th}$ bit is to use the parity of selected bits in the region as an indicator. For example, use the parity of the lower 5 bits of the 4×4 pixels in the lower right corner for parity, and the 64$^{th}$ bit is one of these parity bits on the least significant bit plane. If the region does contain depth information (n>0), then this 64th bit is chosen after embedding to make the parity odd. If the region is relatively flat (n=0), then the parity is made even, and the depth map is found in another region. In this manner, the depth map may be located by iterating through each of the regions. It should be noted that, if the region is perfectly flat, the parity of these bits is already even and no change needs to be made to the region to have the correct indication. If the region is almost flat and n should be zero, but the parity is originally odd, then any single parity pixel can be incremented, or decremented, in value in order to create even parity. In some embodiments, the parity pixels may be chosen for this by incrementing or decrementing that pixel that exhibits the greatest difference from its neighborhood average, bringing it closer to the average, tending to smooth an already flat region. Finally, it is noted that incrementing, decrementing, or both, will change the parity of any given set of lower bits in a pixel. Further, if incrementing or decrementing once does not change the parity, then doing so twice must change the parity.

In practice, each steganography program, whether utilizing BPCS or PDCS, will include both the encoder component and the decoder component. The program can be used either as an "Encoder-and-Decoder", as an "Encoder", or as a "Decoder." Such versatility allows for private use of a customized Encoder-and-Decoder or for the sharing of a customized Encoder-and-Decoder within a group. Further, as noted above, parameters may be varied in both the BPCS and PDCS embodiments in order to provide sufficient customization to prevent unauthorized decoding of encoded data.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein. The method also works with black and white images and with images in other bit-mapped formats.

What is claim is:

1. A method for embedding data within a vessel image having a plurality of bit planes said method comprising the steps of:
   segmenting the vessel image into a plurality of informative regions and a plurality of noise-like regions based upon at least one statistical property of said regions of the vessel image;
   arranging the data into a series of data blocks;
   embedding each data block into at least one of said plurality of noise-like regions.

2. The method as claimed in claim 1 wherein said regions are bit-plane regions and said statistical property is a complexity of said region and wherein said step of segmenting each bit plane comprises the steps of:
   measuring the complexity of each region; and
   determining whether the complexity exceeds a region threshold complexity.

3. The method as claimed in claim 2 wherein said step of measuring a complexity of each of said regions comprises the step of measuring a length of a black and white border in said region.

4. The method as claimed in claim 2 further comprising the steps of:
   measuring a complexity of each data block;
   determining whether said complexity exceeds a data threshold complexity;
   conjugating said data block if said complexity of said data block does not exceed said data threshold complexity; and
   creating a conjugation map to indicate which of the data blocks have been conjugated.

5. The method as claimed in claim 4 further comprising the step of embedding the conjugation map into at least one of said plurality of noise-like regions.

6. The method as claimed in claim 5 wherein said conjugation map is disguised utilizing a method chosen from a group consisting of an exclusive-or with value method and an addition with value method.

7. The method as claimed in claim 2 wherein said vessel image is a non-gray coding system image and wherein said method further comprises the steps of:
   transforming the vessel image into a gray coding system image prior to said step of segmenting each bit plane; and
   transforming a resulting image from a gray coding system image back to a non-gray coding system image after said step of embedding the data.

8. The method as claimed in claim 1 wherein the vessel image includes a plurality of pixels, and wherein said pixels are arranged in an array selected from a group consisting of a triangular array, a rectangular array and a hexagonal array.

9. The method as claimed in claim 1 wherein said regions are image regions and wherein said step of segmenting said vessel image comprises the steps of:
   determining a complexity of each image region based on a statistical property of the pixel values within said region; and
   determining a number of noise-like bit planes within each image region based upon said complexity of each image region.

10. The method as claimed in claim 9 wherein said step of determining a complexity of each image region comprises the step of determining differences between a plurality of adjacent pixels within said region; and
    wherein said step of determining a number of noise-like bit planes within each image region is based upon a histogram of said differences.

11. The method as claimed in claim 10 wherein said step of determining a number of noise-like bit planes within each image region comprises the steps of:
    selecting a threshold value, M, for said histogram of said differences; and
    computing said number of planes based upon a value of a logarithm of the value of the Mth largest difference.

12. The method as claimed in claim 10 further comprising the step of:
    fitting a plane to pixel data in each region; and
    subtracting said plane from each pixel value before computing the pixel differences.

13. The method as claimed in claim 9 further comprising the step of creating a depth map of said noise-like bit planes within each region.

14. The method as claimed in claim 13 further comprising the step of embedding the depth map into at least one of said plurality of noise-like regions.

15. The method as claimed in claim 14 wherein said depth map is disguised utilizing a method chosen from a group consisting of an exclusive-or with value method and an addition with value method.

16. The method as claimed in claim 9 further comprising the step of adding or subtracting a value of $2^n$ from selected pixels in a noise-like region.

17. The method as claimed in claim 1 wherein said vessel image is an RGB image and wherein said step of segmenting said image comprises the steps of:
    segmenting a red component of said vessel image;
    segmenting a green component of said vessel image; and
    segmenting a blue component of said vessel image.

18. The method as claimed in claim 1 wherein at least one of said data blocks is disguised utilizing a method chosen from a group consisting of an exclusive-or with value method and an addition with value method.

19. A computer program product for controlling a computer for embedding data within a vessel image having a plurality of bit planes, said computer program product comprising:

a recording medium readable by the computer;

means recorded on said recording medium for segmenting the vessel image into a plurality of informative regions and a plurality of noise-like regions based upon at least one statistical property of each region of the vessel image;

means recorded on said recording medium for arranging the data into a series of data blocks; and means recorded on said recording medium for embedding each data block into one of said plurality of noise-like regions.

20. The computer program product as claimed in claim 19 wherein said statistical property is a complexity of said region and wherein said means for segmenting each bit plane comprises:

a means for measuring the complexity of each region; and a means for determining whether the complexity exceeds a region threshold complexity.

21. The computer program product as claimed in claim 20 wherein said means for measuring a complexity of each region comprises a means for measuring a length of a black and white border in each region of the vessel image.

22. The computer program product as claimed in claim 20 further comprising:

means recorded on said recording medium for measuring a complexity of each data block;

means recorded on said recording medium for determining whether said complexity exceeds a data threshold complexity;

means recorded on said recording medium for conjugating said data block if said complexity of said data block does not exceed said data threshold complexity; and means recorded on said recording medium for creating a conjugation map to indicate which of the data blocks have been conjugated.

23. The computer program product as claimed in claim 19 wherein said means for segmenting comprises:

means for determining a complexity of each region of each bit plane by determining differences between a plurality of adjacent pixels within said region; and means for determining a number of noise-like bit planes within each region based on a histogram of said differences.

24. The computer program product as claimed in claim 23 wherein said means for determining a number of noise-like bit planes within each region comprises a means for selecting a threshold value, M, for said histogram of said differences; and a means for computing said number of planes based upon a value of a logarithm of the value of the Mth largest difference.

25. The computer program product as claimed in claim 19 wherein said vessel image is an RGB image and wherein said means for segmenting said image comprises:

means for segmenting a red component of said vessel image;

means for segmenting a green component of said vessel image; and means for segmenting a blue component of said vessel image.

* * * * *